United States Patent
Cannon et al.

(10) Patent No.: US 12,058,229 B2
(45) Date of Patent: Aug. 6, 2024

(54) EDGE NODE, MESH NETWORK AND METHOD TO DELIVER CONTENT AT AN EDGE OF A MESH NETWORK

(71) Applicant: Veea Systems Ltd., Bath (GB)

(72) Inventors: Mark Joseph Cannon, Gloucestershire (GB); Nicholas Jelbert, Bath (GB)

(73) Assignee: VEEA Inc., New York, NY (US)

( * ) Notice: Subject to any disclaimer, the term of this patent is extended or adjusted under 35 U.S.C. 154(b) by 196 days.

(21) Appl. No.: 15/850,332

(22) Filed: Dec. 21, 2017

(65) Prior Publication Data

US 2018/0183896 A1  Jun. 28, 2018

(30) Foreign Application Priority Data

Dec. 23, 2016 (GB) ...................... 1622098

(51) Int. Cl.
*H04L 67/55* (2022.01)
*H04L 67/52* (2022.01)
*H04L 67/568* (2022.01)
*H04L 67/62* (2022.01)
*H04L 67/63* (2022.01)
*H04W 4/60* (2018.01)
*H04M 1/72406* (2021.01)
(Continued)

(52) U.S. Cl.
CPC .............. *H04L 67/63* (2022.05); *H04L 67/52* (2022.05); *H04L 67/55* (2022.05); *H04L 67/568* (2022.05); *H04L 67/62* (2022.05); *H04W 4/60* (2018.02); *H04M 1/72406* (2021.01); *H04M 1/72445* (2021.01); *H04W 84/18* (2013.01)

(58) Field of Classification Search
CPC ....... H04L 29/08; H04L 67/327; H04L 67/18; H04L 67/26; H04L 67/2842; H04L 67/325; H04L 67/63; H04L 67/52; H04L 67/62; H04L 67/568; H04L 67/55; H04W 4/60; H04W 84/18; H04M 1/72525; H04M 1/72561
See application file for complete search history.

(56) References Cited

U.S. PATENT DOCUMENTS 8,782,395 B1  7/2014  Ly
8,856,266 B2  10/2014  Zilliacus
(Continued)

FOREIGN PATENT DOCUMENTS

CN  103 841 510 A  6/2014
CN  105979298 A  9/2016

OTHER PUBLICATIONS

European Patent Application No. 17209308.0-1213; Extended European Search Report Dated May 14, 2018, 11 pages.
(Continued)

*Primary Examiner* — Dhairya A Patel
(74) *Attorney, Agent, or Firm* — FITCH EVEN TABIN & FLANNERY, LLP (57) ABSTRACT

A network entity is provisioned to support cloud services for a mesh network that includes at least one edge node. The network entity comprises: a processor, operably coupleable to a content store; and a content agent registry coupled to the processor and configured to identify content to be delivered to the at least one edge node. The content agent registry records at least one attribute against the content to be delivered based on a characteristic of the content.

12 Claims, 7 Drawing Sheets

(51) Int. Cl.
*H04M 1/72445* (2021.01)
*H04W 84/18* (2009.01)

(56) References Cited

U.S. PATENT DOCUMENTS

| | | | | |
|---|---|---|---|---|
| 2003/0023757 | A1* | 1/2003 | Ishioka | H04L 29/06 709/246 |
| 2005/0268343 | A1 | 12/2005 | Onoda et al. | |
| 2007/0021110 | A1* | 1/2007 | Chaudhri | H04L 67/325 455/418 |
| 2007/0197196 | A1 | 8/2007 | Shenfield | |
| 2008/0194272 | A1* | 8/2008 | Smith | G06Q 30/02 455/456.3 |
| 2008/0242280 | A1* | 10/2008 | Shapiro | H04N 21/41407 455/414.3 |
| 2009/0187593 | A1* | 7/2009 | Chen | G06F 16/437 |
| 2010/0211535 | A1* | 8/2010 | Rosenberger | G06F 16/48 706/20 |
| 2011/0107213 | A1* | 5/2011 | Johnson | G11B 27/329 715/704 |
| 2011/0167130 | A1* | 7/2011 | Cochran | H04L 67/04 709/217 |
| 2012/0109902 | A1* | 5/2012 | Rozensztejn | H04L 67/2852 707/689 |
| 2013/0122934 | A1* | 5/2013 | Branch | H04W 4/21 455/456.3 |
| 2013/0246560 | A1* | 9/2013 | Feng | G06F 16/182 709/217 |
| 2014/0330881 | A1* | 11/2014 | Stone | H04L 67/10 709/201 |
| 2016/0072865 | A1 | 3/2016 | Kalinger et al. | |
| 2016/0127447 | A1* | 5/2016 | Jiang | G06F 9/452 709/203 |
| 2016/0212484 | A1* | 7/2016 | Kimble | H04N 21/4667 |
| 2017/0255966 | A1* | 9/2017 | Khoury | B60W 40/00 |
| 2018/0150892 | A1* | 5/2018 | Waldron | H04L 67/306 |

OTHER PUBLICATIONS

Chung-Horng Lung et al.; Design and Performance Evaluation of Cloud-Based XML Publish/Subscribe Service; 2014 IEEE International Conference on Services Computing; Jun. 27, 2014; pp. 583-589.

Bjorn Richerzhagen et al.; Seamless Transitions Between Filter Schemes for Location-based Mobile Applications; 2016 IEEE 41st Conference on Local Computer Networks; Nov. 7, 2016, pp. 348-356.

Tsaheel Al-Mudaihesh et al.; A Publish-Subscribe Model for Cloud-Based Internet Protocol Television Surveillance Systems, 2016 5th International Conference on Informatics, Electronics and Vision (CIEV), May 13, 2016, pp. 955-960.

British Patent Application No. GB1622098.0; Combined Search and Examination Report Under Sections 17 and 18(3); Dated Jun. 21, 2017.

European Patent Application No. 21169930.1; Extended Search Report dated Jan. 19, 2022; 16 pages.

Lerts:Insrubtavee AD:Isorn et al: "Comparing NDN and CDN Performance for Content Distribution Service in Community Wireless Mesh Network", Proceedings 01' The AINTEC 2014 on Asian :Internet Engineering Conference, AINTEC · 14, [Online] Jan. 1, 2014 (Jan. 1, 2014), pp. 43-50, XP055829081, New York, New York, USA.

* cited by examiner

EDGE NODE, MESH NETWORK AND METHOD TO DELIVER CONTENT AT AN EDGE OF A MESH NETWORK

RELATED APPLICATION

This application claims the benefit of Great Britain Application No. 1622098.0 filed Dec. 23, 2016. The content of this application is fully incorporated herein in its entirety.

TECHNICAL FIELD

The field of this invention relates generally to an edge node, a mesh network and a method to deliver content at an edge of the mesh network. In particular, some example embodiments of the invention provide for a cloud and an edge node that are configured to push or pull content from the cloud based on a characteristic of the content.

BACKGROUND

A recent development in wireless communications is long term evolved (LTE™), which supports the operation of internet protocol (IP) techniques, such as IPv6, as well as other wireline communications. Using IPv6 in a wireless or wireline communication system is convenient to allow for internet protocol (IP) connectivity for many end user devices, possibly in a number of different subnets so that they can receive large volumes of content quickly.

Directed mesh topology is an example of a small network where there is at least one 'sink' node that provides connectivity into the network. Within this context there are 3 types of devices: End nodes, Mesh routers, and Edge nodes.

End nodes are communication devices that communicate using mesh transport technology (typically WiFi™) to either an edge node or a mesh router. An end node device provides no routing functionality for data from other devices. End node devices may obtain an Internet Protocol (e.g. IPv6) prefix (address) from router advertisements sent from an edge node, which may be relayed through mesh routers. End node communication devices do not have routing capability and can only operate as, say, 'leaves' in the mesh network.

Mesh router devices are communication devices that communicate using mesh transport technology (also typically WiFi™) to either an edge node or another mesh router. Mesh routers are able to support routing in the mesh network, i.e. they can relay traffic from a second node (either an end node or another mesh router) towards the edge node. Mesh router devices provide routing functionality for data from other devices, which may be either an end node or another mesh router. Mesh router devices also obtain an IPv6 prefix (address) from router advertisements sent from an edge node, which may be relayed through other mesh routers.

Edge nodes not only manage the mesh network and communicate with either end nodes or mesh routers, but also provide routing into the wider IP network, typically a cellular network or the public internet via a backhaul link, thereby linking the mesh network to the public internet and routing traffic between the two technologies. A backhaul link can be accomplished by a number of technologies for example a wired Ethernet connection, WiFi™ link or possibly a cellular technology connection. This results in networks that have to be planned.

Edge nodes act as a requesting router in IPv6 prefix (address) delegation to obtain an IPv6 prefix, which it uses in router advertisements advertising this prefix value into the mesh network. There is at least one edge node in each mesh cluster. In a home environment, the edge node must be placed in a central location so as to provide connectivity throughout the house.

Figure 1:
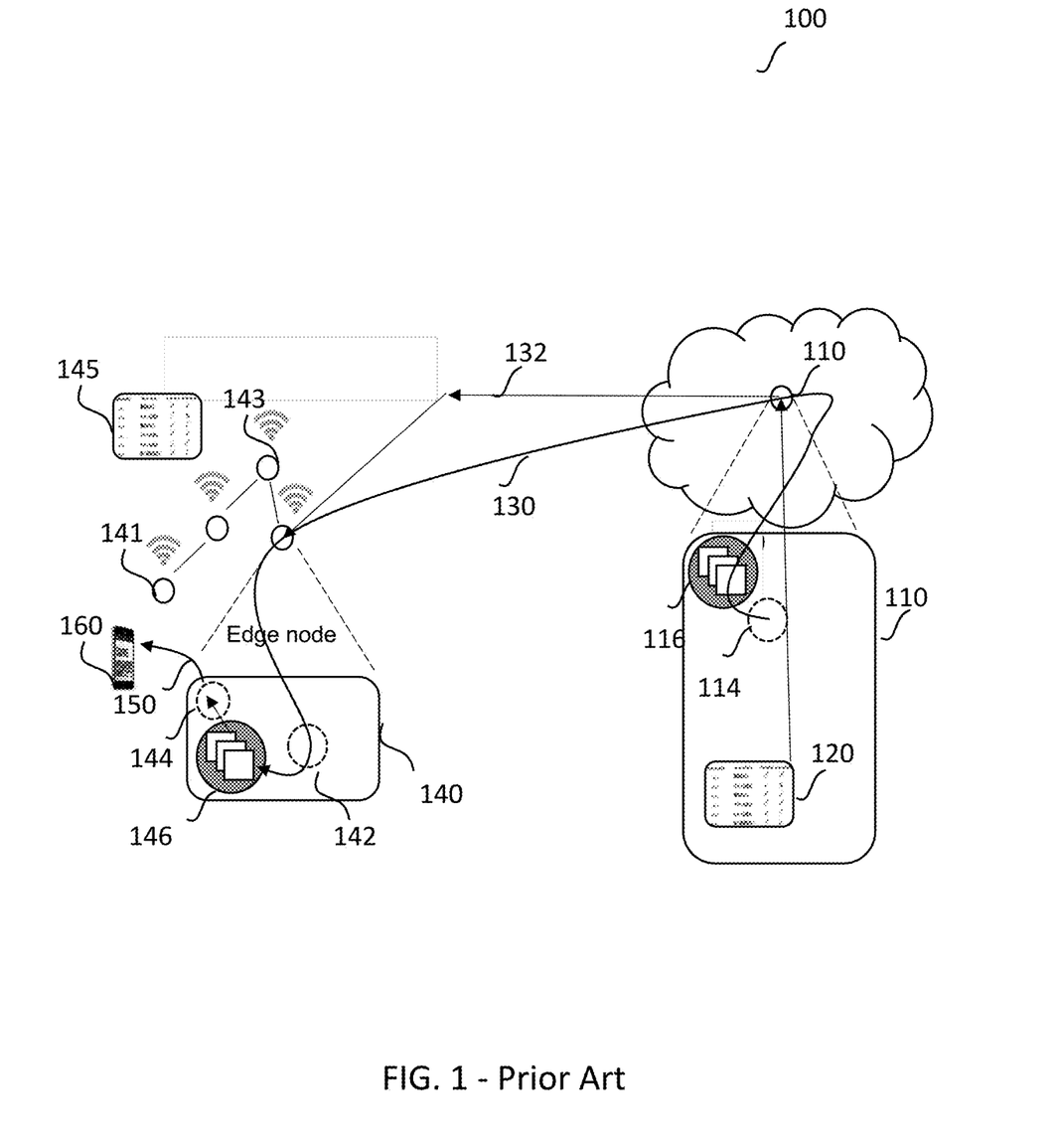
FIG. 1 illustrates an overview of a known network architecture for content download.

Referring now to FIG. 1, an overview of a known architecture 100 of content being delivered and stored at the network edge is shown. The known architecture 100 includes a cloud processing entity 110 that includes a cloud-based management entity 120 that stores content. The principal mechanism for storing large volumes of content in the architecture 100 of FIG. 1 has typically required cloud based services, due to the ability to centralise the control, management, indexing and retrieval of content. Cloud storage uses what is referred to as a cloud computing model, in which data is stored on remote servers accessed from the Internet, or the so-called 'cloud.' It is maintained, operated and managed by a cloud storage service provider typically on a number of storage servers that are built on virtualization techniques.

The principal drawback of centralising content in a cloud storage architecture in the manner of FIG. 1 is that good communication links to the network edge are required in order to retrieve, download and stream content that is managed centrally. If content is likely to be retrieved on an ad-hoc basis, at any time, and on-demand, then storing this content centrally works well.

The cloud processing entity 110 of FIG. 1 includes a content scheduler 114 and a cache of content 116. The cloud processing entity 110 includes a backhaul link 130 to a plurality of edge nodes (or edge routers), such as edge node 140. The backhaul link 130 may be wired e.g. broadband, or wireless e.g. cellular.

Edge node 140 includes a content agent 142 that routes downloaded content 132 to a content store (e.g. a cache) 145. Within the edge node, a dedicated or $3^{rd}$ party application resides and serves content via a wireless link 150 to mobile subscriber device 160. The edge node 140 has access to a dedicated local management of content at a cache 145, as well as being connected to other edge nodes and mesh router devices 141, 143 in order to disseminate content locally. Thus, it is not necessarily just the nodes with a direct backhaul link 130 that can receive content 132. Effectively, the edge node 140 acts as both an agent for content 132 downloaded from the cloud and a content scheduler for other nodes, e.g. nodes 141, 143 at the network edge. This avoids each node 141, 143 in the edge network from having to download content 132 from the cloud 110 direct. In principle, a node can be either a principal node at the network edge or a subordinate node in the mesh.

The edge node 140 allows the combination of edge storage, deployed applications and connectivity for devices that consume content. The edge node may also support a mesh capability to extend the reach of content 132 at the network edge. Applications on general purpose edge nodes, applications in the cloud and mobile applications each co-ordinate delivery of content to network edge.

Also well-known is the concept of a software 'container'. An example of a 'container' based on an open standard is Docker™. Docker™ containers wrap a piece of software in a complete filesystem that contains everything needed to run: code, runtime, system tools, etc.

A mechanism is required to improve the management and delivery of stored content in current and future networks, particularly to the edges of networks and to edge nodes. A mechanism is also needed to address a problem where there may be new content available in a central storage, such as in a cloud system, but the edge node does not know that it is there unless a manual check is made. Furthermore, a mechanism is needed where an edge node may have an 'app' to run the content, but not the most appropriate 'app' to run content that has been downloaded.

SUMMARY OF THE INVENTION

In a first aspect of the invention, a network entity provisioned to support cloud services for a mesh network is described. The network entity includes at least one edge node, wherein the network entity comprises a processor, operably coupleable to a content store; and a content agent registry coupled to the processor and configured to identify content to be delivered to the at least one edge node, wherein the content agent registry records at least one attribute against the content to be delivered based on a characteristic of the content.

In this manner, a mechanism to improve the management and delivery of stored content in current and future networks is described, particularly to the edges of networks and to edge nodes. In this manner, a mechanism to address the problem where there may be new content available in a central storage location, such as in a cloud system, but the edge node does not know that it is there unless a manual check is made is achieved. Furthermore, in this manner, a mechanism is provided to address a problem where an edge node may have an 'app' to run the content, but where the most appropriate 'app' to run content has not previously been downloaded.

In an optional example of the invention, the characteristic may be associated with content that is to be delivered according to at least one of the following: content that is delivered in a predictable manner; content that is scheduled; content that is made available for a limited period of time; content that is made available for a particular geographic location. In this manner, the type of content may dictate the downloading and use of the content.

In an optional example of the invention, the content agent registry may be configured to specify an application to run on an edge node for the content to be delivered. In an optional example of the invention, the processor may be configured to deliver the specified application with the content based on an indication in the content agent registry. In this manner, the content may always be used with the most appropriate application for that specific content.

In an optional example of the invention, the content agent registry may be configured to use the at least one attribute(s) to determine whether the cache contains any content matching the at least one attribute(s) and, if said matched content is identified, to deliver said matched content to the at least one edge node. In an optional example of the invention, the processor may be configured to deliver said matched content to the at least one edge node by pushing the content from the cache to the at least one edge node in response to the at least one attribute contained in the content agent registry. Alternatively, in other examples, the processor may be configured to receive a query for the content from the at least one edge node, send a response to the query and facilitate said matched content being pulled by the at least one edge node from the cache in response to the at least one attribute contained in the content agent registry.

In an optional example of the invention, the content agent registry may be configured to determine whether other content with the identified at least one attribute is stored in the cache, and, if other content with the identified at least one attribute exists, to download the other content to the edge node.

In an optional example of the invention, the content agent registry may include a register of the meta-data associated with the content, but where the meta-data is also used to organise the content on a per attribute basis. In an optional example of the invention, the content agent registry may be further configured to associate the meta-data with the content.

In an optional example of the invention, the processor may be configured to identify whether the content being delivered to the at least one edge node is associated with content that has a limited period of time, and, upon identifying that the content being delivered to the at least one edge node is associated with content that has a limited period of time, the processor is configured to autonomously download new content associated with the content attribute to the at least one edge node at a given rate.

In an optional example of the invention, the processor may be coupled to a content scheduler and configured to identify whether the content to be delivered is scheduled, and, upon identifying that the content being delivered to the at least one edge node is scheduled, the content scheduler is configured to autonomously download new content associated with the content attribute to the at least one edge node at a scheduled time.

In an optional example of the invention, the processor may be configured to identify whether new content arrived in the cache relates to a geographical attribute stored in the content registry, and, upon identifying that the content relates to a geographical attribute stored in the content registry of an edge node, the processor is configured to autonomously download new content associated with the content attribute to the at least one edge node.

In an optional example of the invention, the content agent registry may be configured to organise multiple attributes associated with the various content in a hierarchical form, including high order attributes that encompass more content or low level attributes that encompass specific content.

In an optional example of the invention, the content agent registry may be configured to send an indication to the at least one edge node that new content has arrived that contains an attribute that matches at least one attribute recorded in the content agent registry for the at least one edge node.

In a second example of the invention, a method for provision of content from a cloud service to at least one edge node in a mesh network is described. The method comprises, at a network entity: identifying at least one attribute associated with content to be delivered to at least one edge node based on a characteristic of the content; recording the attribute as being associated with the content in a content agent registry; determining whether an attribute associated with the at least one edge node matches an attribute recorded in the content agent registry; and delivering the content to the at least one edge node in response to the match.

In a third example of the invention, an edge node for a mesh network that is configured to support cloud services, is described. The edge node comprises: a processor, operably coupleable to a content store; and a user input coupled to the processor and configured to enable a user of the edge node or a user of a device coupled to the edge node to provision at least one attribute that identifies what future content the user desires or needs, wherein the at least one attribute is based on a characteristic of the content; and a transmitter coupled to the processor and configured to send the at least one attribute to a network entity that comprises a content agent registry to record and identify content to be delivered to the edge node.

In a fourth example of the invention, a communication device is described that comprises: a processor, operably coupleable to a content store; and a receiver coupled to the processor and configured to download content from the content store, wherein the downloaded content has an attribute associated with the content and wherein the receiver is further configured to download a mobile application associated with the content. The processor is configured to delete both the mobile application and the downloaded content in response to the processor determining that the attribute associated with the content is no longer applicable.

In some examples, the communication device may further comprise a timer coupled to the processor and configured to monitor whether the time-limit of the time-limited tag has expired; and the processor is configured to delete both the mobile application and the downloaded content in response to the processor determining that an expiry of the time-limited tag has occurred.

In some examples, the communication device may further comprise a location circuit coupled to the processor and configured to monitor a geographical location of the communication device, wherein the processor is configured to delete both the mobile application and the downloaded content in response to the processor determining that the communication device has moved outside of the geographical location that is associated with the downloaded content.

In a fifth example of the invention, a method for a communication device is described. The method comprises: downloading content from a content store, wherein the downloaded content has an attribute associated with the content; downloading with the content a mobile application associated with the content; determining whether the attribute associated with the content is still applicable; and deleting both the mobile application and the downloaded content in response to determining that the attribute associated with the content is no longer applicable.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Example embodiments of the present invention are described with respect to resolving an observation by the inventors that content delivery may be improved based on one or more characteristics of the content to be delivered. In particular, examples of the invention recognise and resolve some problems when deploying cloud services at a network edge, for example in a mesh network. For example, certain characteristics related to some content and data that are to be downloaded, for example from a cloud storage, may lead to a desire to store the content at, or coupled to, an edge node, for example in a mesh network. In this manner, it may be possible to avoid a penalty on the network when downloading such content with these characteristics.

A first content characteristic that may be taken into account in the delivery and storage of content is content that is requested in a predictable manner. As an example of this first content characteristic, there are schemes that will automatically download content, e.g., a web cache. A second content characteristic that may be taken into account in the delivery and storage of content is content that can be naturally scheduled and made available for a limited period. Broadcast television is an example of this second content characteristic. A third content characteristic that may be taken into account in the delivery and storage of content is content that is always or specifically required because, say, it is uniquely associated with the network edge. In this context, content may be geographically limited. For example, a code for a discount voucher in a particular shop or chain of shops may be downloaded, such that it can only be used at that location. According to examples of the invention, these characteristics may be used in an attribute or tag, which may be attached to the content itself or an application for running the content.

Examples of the invention propose a mechanism to deploy cloud services and provide content at an edge node that is managed both centrally, e.g. in a 'cloud' location, and locally in (or connected to) the edge node. In other examples of the invention, a recognition that an edge node, or a subscriber device connected to the edge node, may not have the most appropriate or best application 'app' running on the node or device, for example in a small wireless mesh network, sometimes referred to as a home network, is addressed. In this example, a content agent registry is provided and configured first to hold (e.g. record) content 'attributes' or 'tags'. The content agent registry may also be configured, in a second function, to specify an application to run on an edge node for this content. The content agent registry may also be configured (in a third function, in some cases) to additionally download the application to run on the mobile device for this content. In the case of holding content 'attributes', the edge node application is downloaded immediately, if it is not already present at the edge node, and the content installed. If the application is already present on the edge node, there is no need to install it. For example, the application may be a media streaming service and the content a video clip that is preferably viewed by that media streaming service. The final decision whether to download content or an application is made by the edge node. In the edge node-initiated case, the reply from the network to the edge node indicates that there is content available and also that an application is available (with the details of the application). In this manner, the edge node will know whether or not the application should be downloaded. Similarly, in the network-initiated case, when the network indicates to the edge node that new content is available, there will be details of the application. The edge node knows what applications it has (and which version) and so can decide whether or not to download it.

In the case of the third function, the mobile app may also be downloaded immediately, if it is not present, and stored on the edge node, for example pulled by the edge node when it realizes that it does not have the up to date app. Alternatively, when a mobile device accesses the edge node (typically through a web portal or another dedicated app) then the user may be provided with the option to view the content in the associated mobile app. If this option is selected then the mobile app is downloaded and then runs to show the content.

Figure 2:
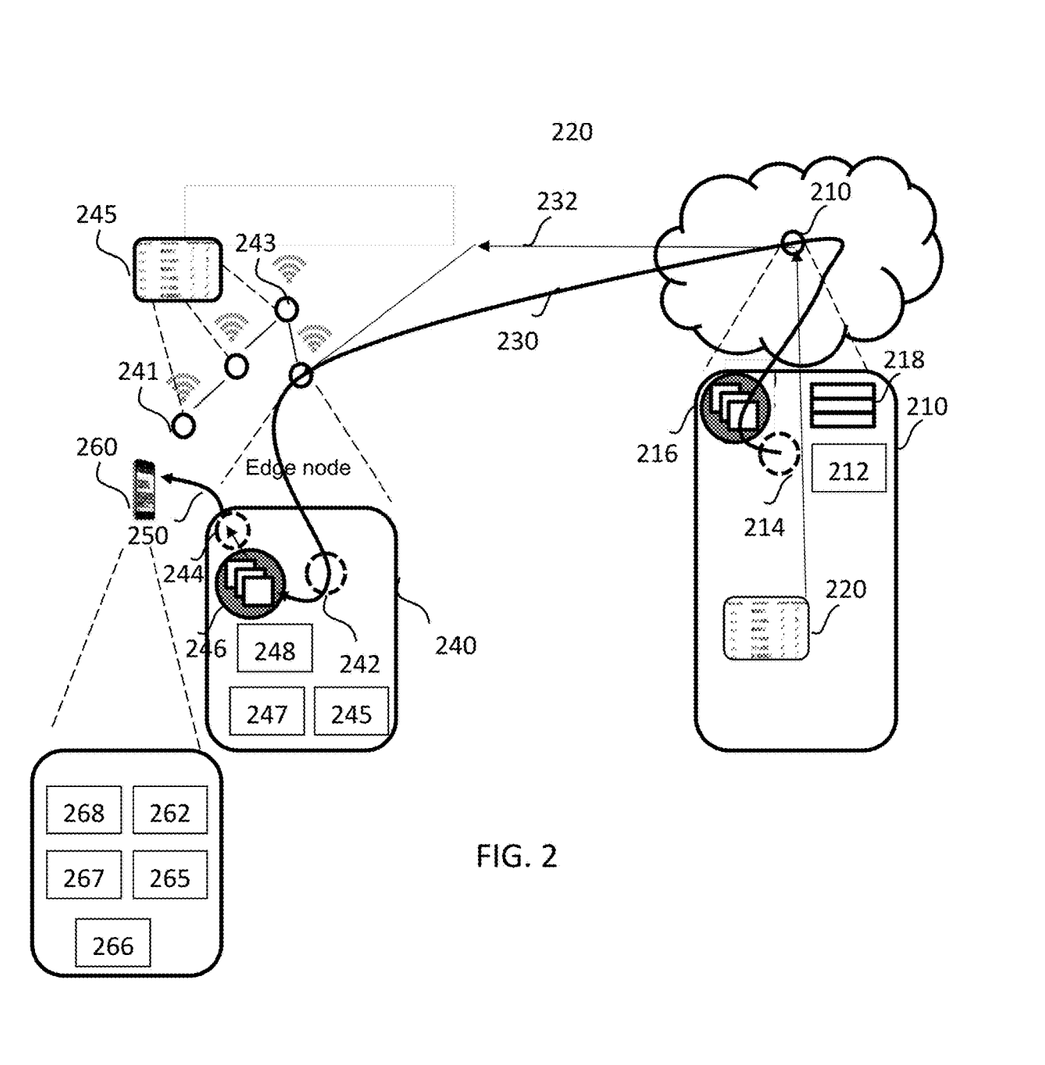
FIG. 2 illustrates an example overview of a network architecture for content download, in accordance with some example embodiments of the present invention.

Referring now to FIG. 2, an example overview of a network architecture 200 for improved content delivery is illustrated, in accordance with some example embodiments of the present invention. Example embodiments of the present invention are described with respect to a distributed management of content. Example embodiments of the present invention are also described with respect to a content delivery based on one or more characteristic of the content. The network architecture 200 includes a network entity 210 configured to perform cloud functionality. The network entity 210 includes a cloud-based management entity 220 that stores content.

The network entity 210 configured to perform cloud functionality includes one or more processors 212, a content scheduler 214 and a cache 216 of content. In accordance with example embodiments of the invention, the network entity 210 includes a content agent registry 218. In accordance with example embodiments, content agent registry 218 may be considered as a register of the meta-data associated with the content, but where the meta-data is also used to organise the content in the cache. In some examples, therefore, there are 'tags' or attributes within the meta-data associated with the content. The content agent registry 218 is configured to perform at least three primary functions. A first function involves the content agent registry 218 recording the tags or attributes associated with one or more edge node(s). A second function involves the content agent registry 218 ordering the content by attributes. Ordering content on a per attribute basis allows an edge node to be able to select content that is suitable. Aggregating other meta-data with the content allows the edge node content agent 242 to perform further processing, for example downloading any associated applications (for the edge node or mobile device) that are required to make use of the content. A third function involves the content agent registry 218 also associating the meta-data with the content.

In accordance with example embodiments of the invention, the content agent registry 218 records attributes or 'tags' related to edge nodes (such as edge node 240) and other nodes and devices, which may be provisioned remotely and recorded/stored in the content agent registry 218. In this manner, the attributes or 'tags' may be used by the edge nodes (such as edge node 240) to query the content to be downloaded. Examples of the invention describe a variety of mechanisms for the content to be 'pushed' from the network entity to the edge node 240 based on a characteristic of the content, which is identified by the attribute or tag, examples of which are described in FIG. 5 and FIG. 6. Further examples of the invention also describe an example mechanism for the content to be 'pulled' from the network entity by the edge node 240 based on a characteristic of the content, which is identified by the attribute or tag, one example being described in FIG. 4.

The network entity 210 includes a backhaul link 230 to a plurality of edge nodes (or edge routers), such as edge node 240. The backhaul link 230 may be wired e.g. broadband, or wireless e.g. cellular.

Edge node 240 includes a content agent 242 that routes downloaded content 232 to a content store (e.g. a cache) 246. In this example, a dedicated or $3^{rd}$ party application resides within the edge node and serves content via a wireless link 250 to mobile subscriber device 260. The edge node has access to a dedicated local management of content at a cache 245, as well as being connected to other edge nodes and mesh router devices 241, 243 in order to disseminate content locally. Thus, it is not necessarily just the nodes with a direct backhaul link 230 that can receive content 232. Effectively, the edge node 240 acts as both an agent for content 232 downloaded from the cloud and a content scheduler for other nodes 241, 243 at the network edge. This avoids each node 241, 243 in the edge network from having to download content 232 from the cloud direct. In principle, a node can be either a principal node at the network edge or a subordinate node in the mesh.

In accordance with examples of the invention, attributes or 'tags' that are provisioned at the edge node 240 may be used to query the content agent registry 218 that is located in, or connected to, the cloud in order to determine the (or suitable) content to be downloaded based on the attribute(s) or tag(s). In some examples, the content agent registry 218 may also use those attributes to determine whether the cache 216 contains any other content that matches the attribute(s) or tag(s). In some examples, the content agent registry 218 may also use those attributes to determine whether the cache 216 contains any similar content, identified under the same attribute(s) or tag(s).

Traditionally, content delivered to an edge node would be delivered to a cache and remain there until accessed, used/viewed and deleted. However, in accordance with example embodiments of the invention, a determination is made as to the status of the at least one characteristic of the content that is requested/delivered. For example, a determination may be made as to whether the content is being delivered in a substantially 'predictable' manner. If that content is delivered in a substantially 'predictable' manner, e.g. content delivered, say, daily in nature, such as news, a new download would take place and the previous content deleted. In accordance with examples of the invention, the content may be updated with an attribute or tag based on the content characteristic, and the attribute or tag recorded in the content agent registry 218, which in this example would tag the news content as being (e.g.) daily in nature. The edge node 240 sees that it has received a request from the content store 246. In accordance with examples of the invention, now that the edge node 240 knows that the content is required on a daily basis (because of the tag) then it can autonomously download the new content at a particular rate, e.g. daily. In this manner, the edge node 240 is able to autonomously schedule content download based on a characteristic of the content, which in this context example is a time-limited use of the content that it downloads. Alternatively, in other examples, it is envisaged that the edge node 240 may register for daily content, and have it pushed by, say, a processor 212 in the network entity 210 that performs cloud-based functionality.

Furthermore, in some examples, it is possible to automatically predict what new content is needed based on what content is already contained in the content store 246, for example that the data/content may be out of date/past its time-limited threshold, according to the attribute or tag. In this manner, the management of content is now distributed between the central network entity 210 and the edge node 240, as the cloud content agent registry 218 has all the information about the content and edge nodes, such as edge node 240 that are able to register for content that they are interested in. Thus, there is no longer a need to perpetually update edge nodes specifically, as the combination of the content agent registry 218 and edge node algorithms provide the distributed dissemination.

Figure 5:
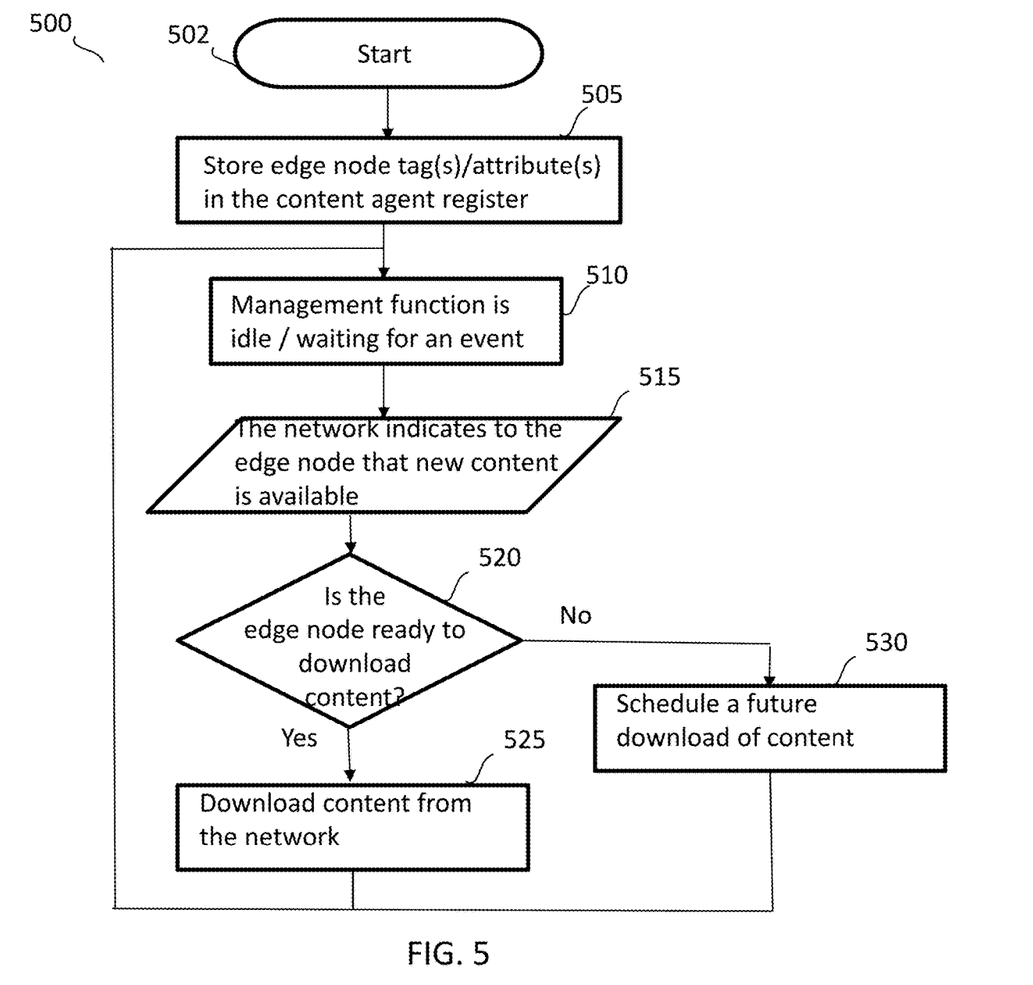
FIG. 5 illustrates a flowchart of a first example of an operation for a 'push' of content from, say, a cloud-based network entity to an edge node in a mesh network, in accordance with some example embodiments of the present invention.

Therefore a content application at the edge node 240 that registers with this attribute will have content automatically downloaded. For example, a 'historic homes' attribute is assigned to content and an application registers with this attribute. The content associated with this attribute is downloaded. Any new content that is tagged at the network entity 210, and recorded in content agent registry 218 with this attribute, is also automatically downloaded, where a trigger is an indication from the network entity 210 that new content in which the edge node 240 has previously indicated an interest is available, as illustrated in FIG. 5. The application may be running on an edge node deployed at a national trust site. One problem that is being solved is that there may be new content available but the edge nodes do not know that it is there.

One advantage of examples of the invention is that the management of the content has changed so that it is not cached manually, but instead it is predictive and also scheduled (e.g. at a quiet time). A further advantage of using attributes or tags to identify content characteristics facilitates a processor 212 located in the network entity 210 being able to 'push' the desired content, or recognize similar content, identified under the same tag or attribute, and 'push' that content, to the edge node 240. Here, the edge node 240 has previously indicated that it is interested in content of a particular type indicated by a tag. So, the edge node 240 has in effect requested content to be pushed, as it becomes available. A further advantage of using attributes or tags to identify content characteristics facilitates edge nodes being able to 'pull' the desired content, or recognize similar content, identified under the same tag or attribute, and 'pull' that content, by indicating to the Content Agent Registry 218 that it wants content.

In some examples, a communication device, such as the subscriber device 260 or a network device such as edge node 240 is described. The communication device comprises: a processor 245, 265, that operably coupleable to a content store; and a receiver (e.g. as part of transceiver 262 in subscriber device 260) coupled to the processor 245, 265 and configured to download content from the content store, wherein the downloaded content has an attribute associated with the content and wherein the receiver is further configured to download a mobile application associated with the content. The processor 245, 265 is configured to delete both the mobile application and the downloaded content in response to the processor determining that the attribute associated with the content is no longer applicable.

In some examples, the communication device may further comprise a timer 247, 267 coupled to the processor 245, 265 and configured to monitor whether the time-limit of the time-limited tag has expired; and the processor 245, 265 is configured to delete both the mobile application and the downloaded content in response to the processor determining that an expiry of the time-limited tag has occurred.

In some examples, the communication device may further comprise a location circuit 248, 268 coupled to the processor 245, 265 and configured to monitor a geographical location of the communication device, wherein the processor 245, 265 is configured to delete both the mobile application and the downloaded content in response to the processor determining that the communication device has moved outside of the geographical location that is associated with the downloaded content.

Figure 3:
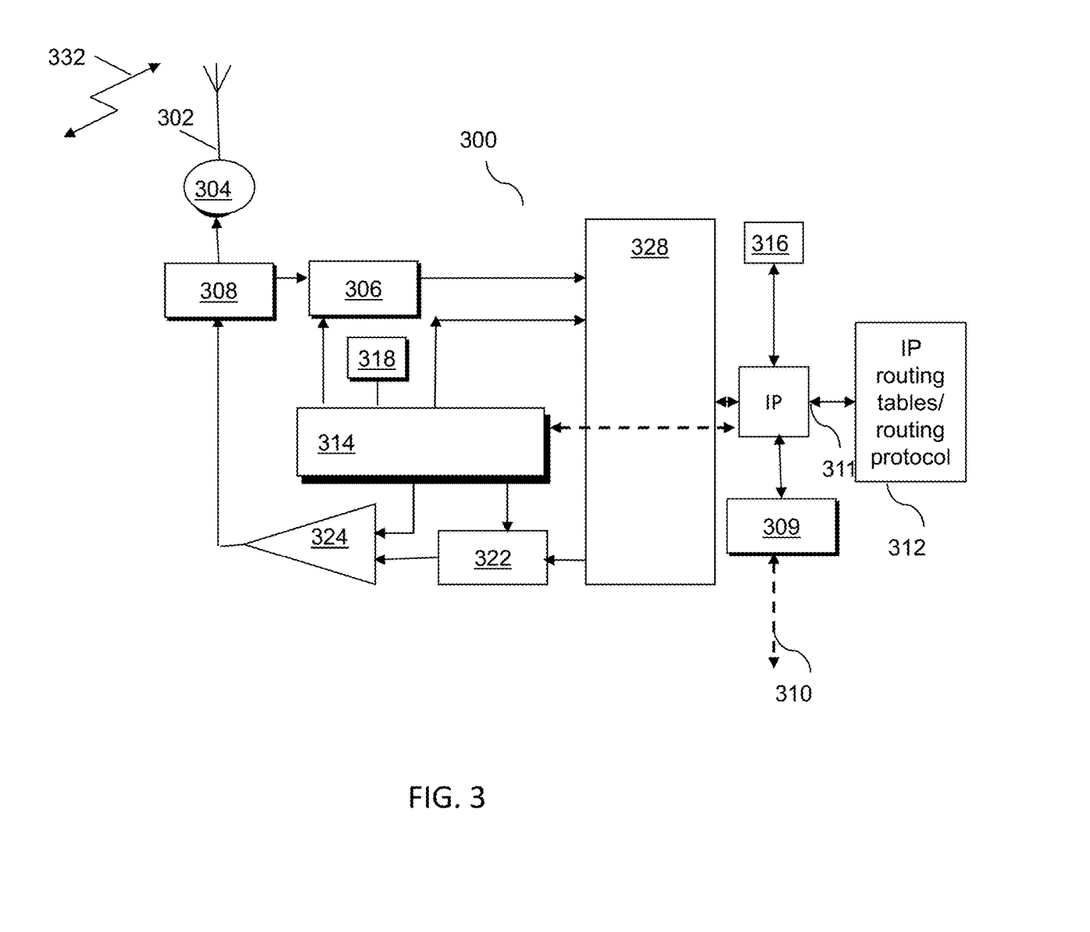
FIG. 3 illustrates an example of an edge node, such as a router node in a mesh network, in accordance with some example embodiments of the present invention.

Referring now to FIG. 3, an example of an edge node 300, such as an edge node in a mesh network modified by the functionality herein described, is illustrated in accordance with some example embodiments of the present invention. In example embodiments of the invention the edge node 300 has been modified such that it receives and handles content differently, dependent upon at least one content characteristic. For example, the edge node 300 may be configured to receive and handle content differently, dependent upon whether the content is delivered in a predictable manner; content that is scheduled; content that is made available for a limited period of time; content that is made available for a particular geographic location. In some examples, the edge node 300 has been configured to assign a tag or attribute to content of interest to the edge node, or edge node user, related to a type of content. In some examples, the edge node 300 may be configured to send a query to the network entity regarding content that is stored in a cache connected to a network entity, for example in a cloud system, based on the assigned tag or attribute. In some examples, based on a network entity response to the query, the edge node 300 may be configured to pull content from the cache.

In practice, purely for the purposes of explaining embodiments of the invention, the edge node 300 is described in terms of both a wireless communication device and a wireline connected device, such as a computer, network server, laptop, etc. In a wireless sense, the edge node 300 contains one or more antenna(e) 302 for communicating via various wireless technologies. In one example, the one or more antenna(e) 302 (coupled via a wireless interface 308 with associated transmit and receive circuitry) is configured to radiate and receive radiated signals 332 on WiFi™ frequencies or Bluetooth BT™ frequencies or cellular frequencies, e.g. LTE™ over a cellular network (not shown).

In a wireless example, the one or more antenna(e) 302 is coupled to an antenna switch or duplexer 304 that provides isolation between receive and transmit chains within the edge node 300, as well as providing isolation between circuits targeted for the specific technologies being supported, e.g. LTE™, WiFi™, BT™. One or more receiver chains, as known in the art, include receiver front-end circuitry 306 (effectively providing reception, filtering and intermediate or base-band frequency conversion). The receiver front-end circuitry 306 is coupled to a signal processor 328 (generally realized by a digital signal processor (DSP)). A skilled artisan will appreciate that the level of integration of receiver circuits or components may be, in some instances, implementation-dependent. A controller 314 maintains overall operational control of the edge node 300. The controller 314 is also coupled to the receiver front-end circuitry 306 and the signal processor 328. A timer 318 is operably coupled to the controller 314 to control the timing of operations (e.g. transmission or reception of time-dependent signals) within the edge node 300.

In this example, controller 314 is connected to an internet protocol (IP) circuit/function 311, which is coupled to a cache 316 and one or more IP routing tables and/or routing protocol software 312. In a wireline sense, the controller 314 may be operably coupled to other devices and nodes via a wireline interface 309 using a wireline connection 310, such as Ethernet. In some examples, the signal processor 328 of the router node 300 may encompass much more functionality than the IP circuit/function 311 and IP routing tables and/or routing protocol software 312. In particular, in some examples, it is assumed that signal processor 328 may handle some or all of the higher layer functionality.

There are a number of different approaches that are envisaged that can be employed for content storage in the edge node 300. Thus, in some examples, the controller 314 is coupled to a cache 316 configured to store content. In examples of the invention, the content includes a tag or an attribute that is associated with the content. In some examples, the tag or attribute may relate to a characteristic of the content, for example whether the content is delivered in a predictable manner; content that is scheduled; content that is made available for a limited period of time; content that is made available for a particular geographic location. In some examples, the tags or attributes associated with the various contents may be organized in families or hierarchies, for example high order tags that encompass more content that has some relationship or low level tags or attributes indicating relatively specific content. In some examples, the cache 316 is also configured to store an app associated with running the content, which may be downloadable to the edge node as well as the content.

In some examples, the cache 316 may also store operating regimes, such as decoding/encoding functions, synchronization patterns, code sequences, and the like to assist wireless communications. As regards the transmit chain, this essentially includes the signal processor 328 being coupled through one or more transmitter/modulation circuits 322 and one or more power amplifiers 324 to the one or more antenna(e) 302, which may be in a form of an antenna array, or a plurality of antennas. The transmitter/modulation circuits 322 and the power amplifiers 324 are operationally responsive to the controller 314.

In accordance with example embodiments, edge node 300, and in particular signal processor 328 of edge node 300, has been configured to respond to an user input of tag/attribute information. For example, the user may provision attributes (or tags) in the edge node that identify what future content the user desires or needs. In some examples, the signal processor 328 and transmitter circuitry of the edge node 300 sends a query to the network's (cloud's) content agent register, such as content agent register 218 in FIG. 4. In some examples, based on a response to the query, the signal processor 328 may 'pull' the content from a cache connected to the network entity, such as network entity 210 of FIG. 2, in the cloud.

In addition, edge node 300 and in particular signal processor 328 of edge node 300 has been configured to support a wireless and/or a wireline connection such as Ethernet. In some examples, signal processor 328 may perform all of the functions required of the edge node 300, or in other examples the signal processor 328 may encompass multiple signal processors, for example dedicated to the various technologies being supported. In this regard, signal processor 328 supporting wireless may be implemented as distinct from a signal processor supporting ethernet™ communication. Alternatively, a single processor may be used to support each technology. Clearly, the various components within the edge node 300 can be realized in discrete or integrated component form, with an ultimate structure therefore being an application-specific or design selection.

Figure 4:
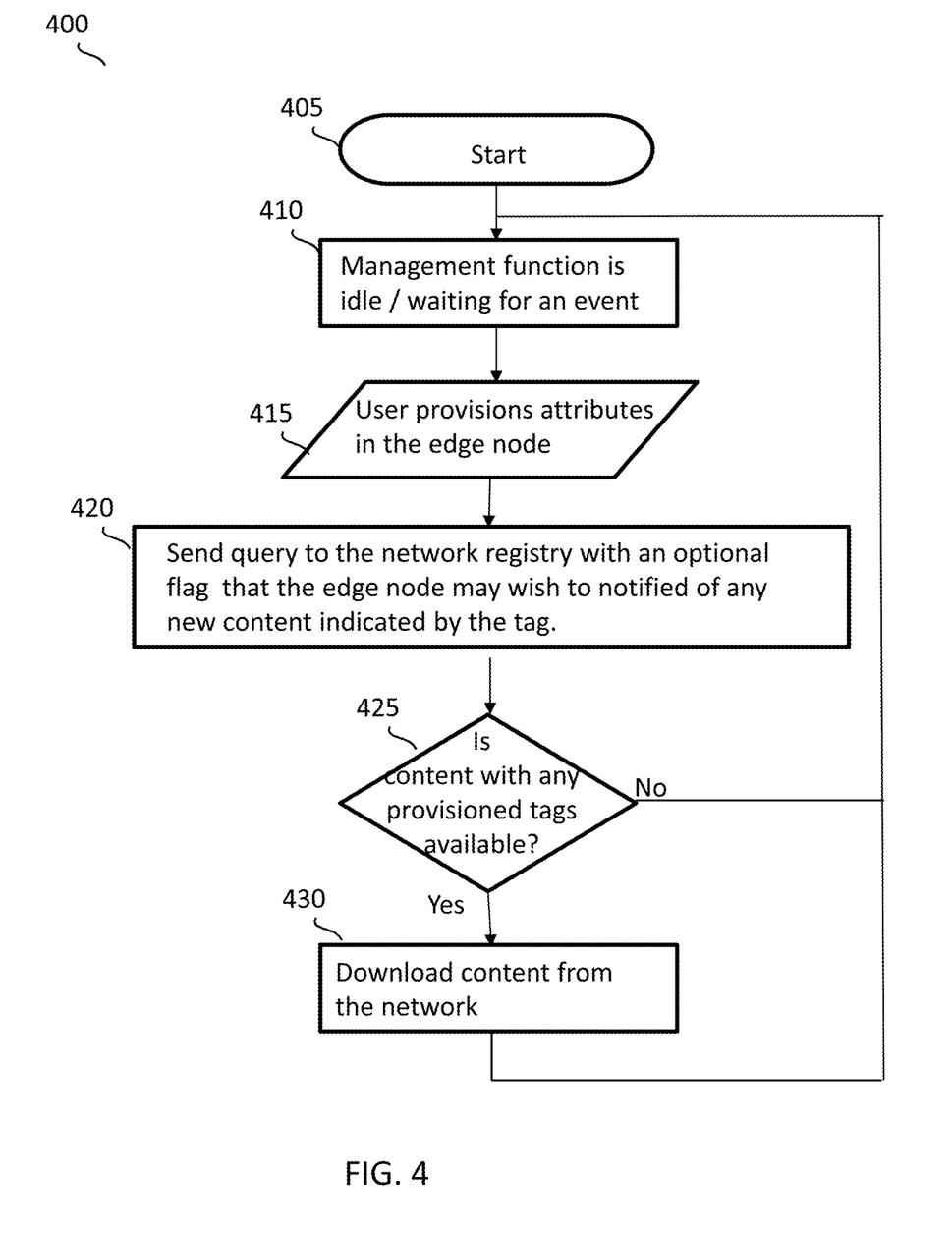
FIG. 4 illustrates a flowchart of an example of an operation for the 'pull' of content by an edge node in a mesh network, in accordance with some example embodiments of the present invention.

FIG. 4 illustrates an example flowchart 400 of an operation for the 'pull' of content from a cache in the network to an edge node, such as edge node 240 in FIG. 2, in accordance with some example embodiments of the present invention. The flowchart 400 starts at 405 and the management processor of the edge node is in an idle mode of operation and waiting for an event to occur in 410. At 415, a user provisions attributes or tags in the edge node, for example via subscriber device 260 in FIG. 2. At 420, the edge node sends a query to the network registry, such as content agent registry 218 of cloud 210 in FIG. 2. In some examples, the edge node may optionally indicate, say via a flag, that it wants to receive content with an identical tag related to similar content in the future, and the attributes or tags may be optionally set in the network registry to indicate that the edge server is interested in receiving similar content that is identified by the same attribute or tag, for example for future downloads. In some examples, it is envisaged that the tags may be organized in families or hierarchies, where, for example, if the edge node indicates interest in a high order tag, it would receive more content. On the other hand if a low level detailed tag, is indicated, then only very specific content may be selected. For example, a user may register a desire to receive financial or stock market updates content via a finance news tag, whereas similar content on business news may be defined under the same tag, if it is a high level tag. In this instance, the content of both can be downloaded.

At 425, a determination is made as to whether any content with any provision attributes or tags is available to download to the edge node. If, at 425, there is no content with any provision attributes or tags available to download to the edge node, the flowchart loops to 410. However, if at 425, there is content with provision attributes or tags available to download to the edge node, the content is downloaded by the edge node and the flowchart loops to 410.

FIG. 5 illustrates a first example flowchart 500 of an operation for the 'push' of content from the network to an edge node, such as edge node 240 in FIG. 2, in accordance with some example embodiments of the present invention. If the edge node is ready to receive data, then it can immediately retrieve the content if the cloud 'pushes' the content to the edge node. Alternatively, if the edge node is ready to receive data, the network may be configured to schedule a download of the content at a future time. The flowchart 500 starts at 502 and, in accordance with this example, the edge node tag(s)/attribute(s) are stored in the cloud/content agent register at 505. In this manner, the network is able to target the edge node for downloading specific new content, based on the stored tag(s)/attribute(s). The management processor of the edge node is in an idle mode of operation and waiting for an event to occur in 510. At 515, the network (such as a processor 212 located in the cloud network entity 210) indicates to the edge node, such as edge node 240 in FIG. 2, that new content is available. At 520 a determination is made as to whether the edge node is ready to download the content from the network, i.e. from cache 216 in the cloud 210 in the example of FIG. 2. If, at 520, the determination is that the edge node is not ready to download the content from the network, a future download of the content is scheduled at 530, for example by a local scheduler, such as content scheduler 214 in cloud 210 from FIG. 2. The flowchart then loops to 510. If, at 520, the determination is that the edge node is ready to download the content from the network, a download of the content is performed at 525 and the flowchart loops to 510.

Figure 6:
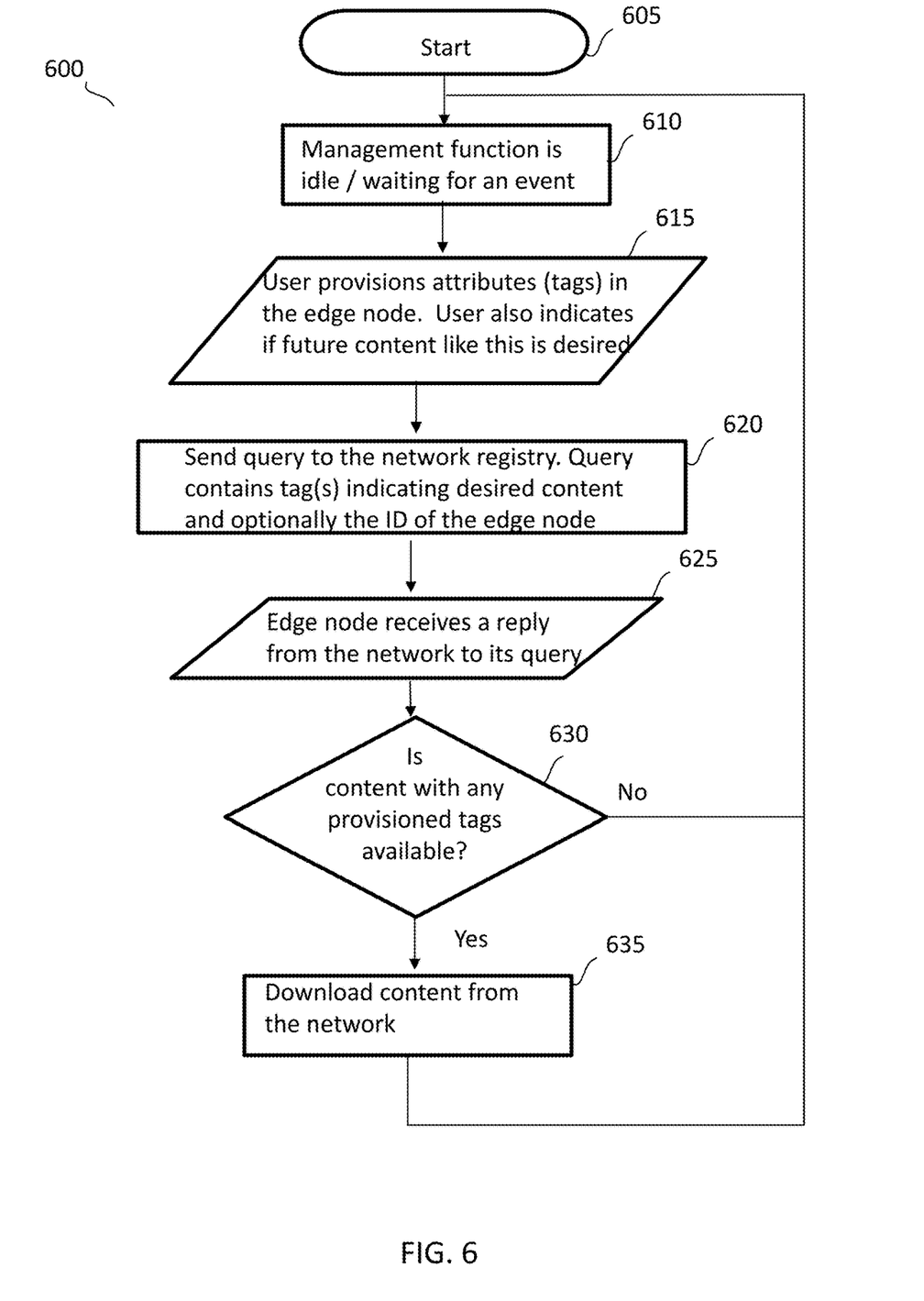
FIG. 6 illustrates a flowchart of a second example of an operation for a 'push' of content from, say, a cloud-based network entity to an edge node in a mesh network, in accordance with some example embodiments of the present invention.

FIG. 6 illustrates a second example flowchart 600 of an operation for the 'push' of content from the network to an edge node, such as edge node 240 in FIG. 2, in accordance with some example embodiments of the present invention. The flowchart 600 starts at 605 and the management processor of the edge node is in an idle mode of operation and waiting for an event to occur in 610. At 615, the user provisions attributes (tags) in the edge node. In some examples, the user may also indicate whether future content like this is desired. At 620, the edge node sends a query to the network's (e.g. cloud's) content agent register, such as content agent register 224 in FIG. 2. In some examples, this query may contain tag(s) indicating desired content and optionally the identifier (ID) of the edge node. At 625, the edge node receives a reply from the network to its query. At 630, a determination is made as to whether any content with provisioned tags is/are available. If no content with provisioned tags is/are available at 630, the process loops back to 610. If content with provisioned tags is/are available at 630, the content is downloaded 'pushed' by the network at 635, i.e. from a cache 216 in the cloud network entity 210 in the example of FIG. 2. The process then loops back to 610. In some examples, the 'pushing' of content may be scheduled by content scheduler 214 in cloud network entity 210 from FIG. 2.

Further examples of the invention are described with respect to a mobile application (often referred to as an 'app') that is downloaded at a network edge, for example by a subscriber device, such as subscriber device 260, connected to an edge node, such as edge node 240 of FIG. 2, of, say, a mesh network. In order to consume content at the network edge, an appropriate app needs to be present on the mobile device. Generic applications, such as web browsers, support many types of content. However, the inventor of the present invention has recognized and appreciated that the ability to download a specific mobile app from the network edge may greatly improve the user experience. In known scenarios, the user of subscriber device 260 would normally have to choose to download the app in advance and then view the content. Alternatively, the user of subscriber device 260 may view a video in a website and be told that they need to download, say, Adobe flash player™, to view it locally. In contrast, according to example embodiments of the invention, the subscriber device 260 is provisioned with the ability to download both content and a specific mobile app associated with the content as a bundle. In this manner, the app is configured to be 'transparent', so that the user is able to experience a content-centric experience. In some examples, the app may only be bundled if it is not already present. In some examples, the app may be identified in the content registry on its own, so may not be bundled explicitly, only if required.

Thus, in accordance with some examples, along with the content to be downloaded either a mobile app and/or a web-app may also be included in the bundle. In some examples, a web-app may be stored on the edge node and subsequently downloaded to a mobile browser. In some examples, a mobile app may be stored on the content device and also downloaded to the mobile by any suitable means, which may also be a through a web page or similar.

In some examples, the mobile app or web-app may be configured to remain on the subscriber device indefinitely. Alternatively, in accordance with some further examples, the mobile app or web-app may be configured to remain on the subscriber device for a defined period or until a defined trigger occurs. In this context, the subscriber device or the mobile app itself, may be configured to delete the app, and/or associated content, based on a time period, for example an expiry of a timer, or based on a geographical location of the subscriber device, or any other suitable triggered event. For example, a mobile 'news' app is downloaded to a subscriber device at, say, a train station and the user is thereafter able to read the news for that particular day. In this example, the mobile app and content may be removed, e.g. deleted automatically, at the end of the day when not in use or, alternatively, removed when the user moves away from the area and the application is no longer in use. One example of this joint app and content deletion mechanism, based on a location trigger or a time period, is illustrated in FIG. 7.

Figure 7:
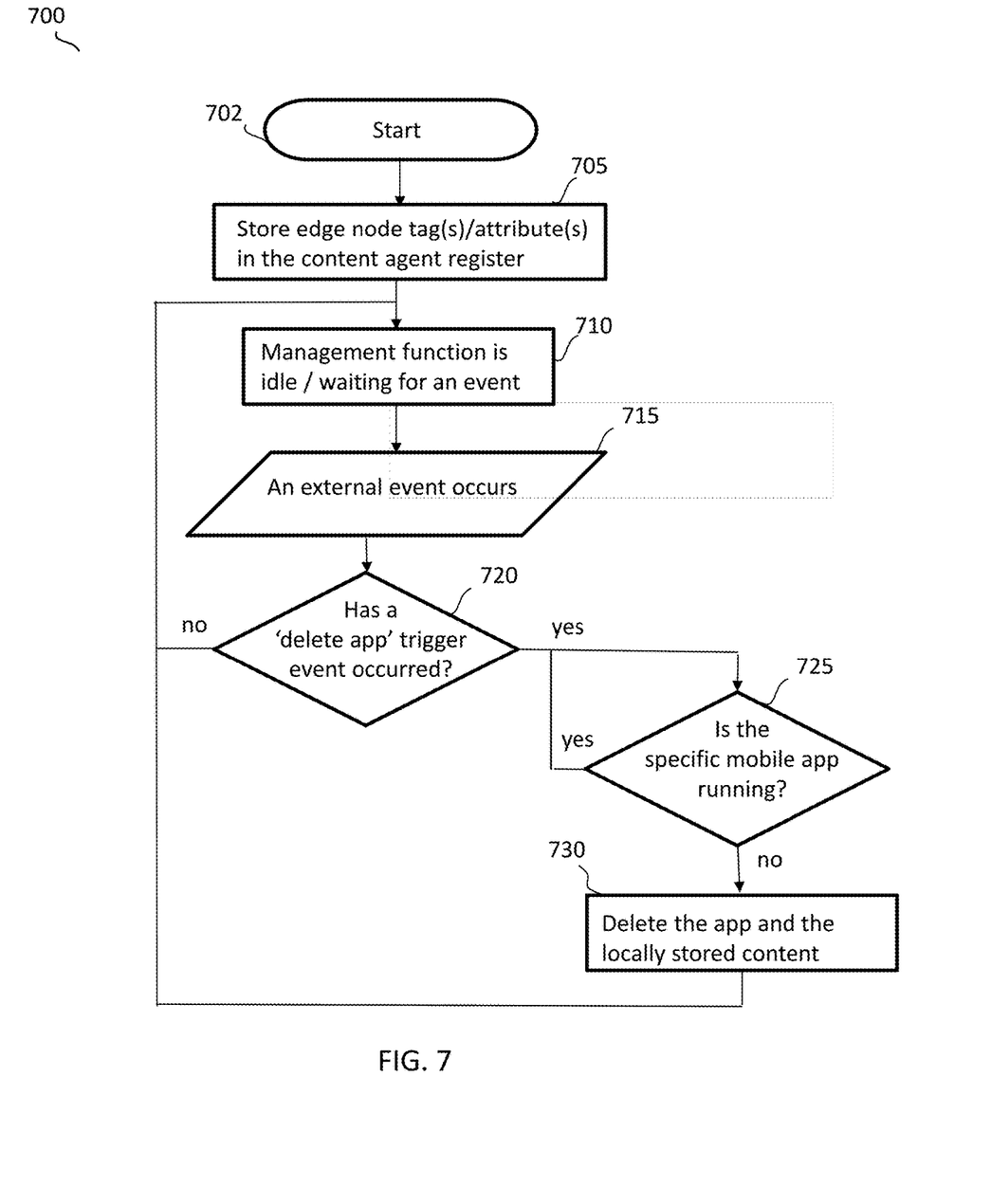
FIG. 7 illustrates a flowchart of an example operation of a content manager in an edge node in accordance with some example embodiments of the present invention.

Referring now to FIG. 7, a flowchart 700 illustrates an example of an operation of communication device. In some examples, the communication device may be an edge node and include a content manager in the edge node, such as content manager 245 coupled to edge node 240 in FIG. 2, in accordance with some example embodiments of the present invention. In some examples, the communication device may be a subscriber device, such as subscriber device 260 communicating 250 with a network device such as edge node 240 in FIG. 2, in accordance with some example embodiments of the present invention.

The flowchart 700 starts at 702 and, in accordance with this example, the edge node tag(s)/attribute(s) are stored in the cloud/content agent register at 705. In this manner, the network is able to target the edge node for downloading specific new content. The management processor is in an idle mode of operation and waiting for an event to occur in 710. At 715, an external trigger event occurs. At 720, a determination is made as to whether a 'delete app' trigger event has occurred. In some examples, the trigger event may result from a variety of different causes, for example an expiry of a timer or a geographical trigger with the user moving out of a geographical area. If, at 720, a determination is made that a 'delete app' trigger event has not occurred, the flowchart loops back to 710. However, if at 720, a determination is made that a 'delete app' trigger event has occurred, the flowchart moves to 725 where a determination is made as to whether the specific mobile app that requires deletion is running. If, at 725, the determination is made that the specific mobile app that requires deletion is running, then the flowchart loops to 725 until the app is no longer in use. However, if at 730 the determination is made that the specific mobile app that requires deletion is not, or no longer, running, then the app and the locally stored content are deleted at 730 and the flowchart loops back to 710.

In the example where the communication device is a subscriber device, a similar processor and receiver located in the subscriber device are configured to perform the functions of FIG. 7. Thus, in essence, the communication device may be configured to download content from a content store, wherein the downloaded content has an attribute associated with the content; download with the content a mobile application associated with the content; determine whether the attribute associated with the content is still applicable; and delete both the mobile application and the downloaded content in response to determining that the attribute associated with the content is no longer applicable.

In some examples, the communication device may further comprise a timer coupled to the processor and configured to monitor whether the time-limit of the time-limited tag has expired; and wherein the processor is configured to delete both the mobile application and the downloaded content in response to the processor determining that an expiry of the time-limited tag has occurred.

In some examples, the communication device may further comprise a location circuit coupled to the processor and configured to monitor a geographical location of the communication device, wherein the processor is configured to delete both the mobile application and the downloaded content in response to the processor determining that the communication device has moved outside of the geographical location that is associated with the downloaded content.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors.

Thus, the elements and components of an embodiment of the invention may be physically, functionally and logically implemented in any suitable way. Indeed, the functionality may be implemented in a single unit, in a plurality of units or as part of other functional units. Those skilled in the art will recognize that the functional blocks and/or logic elements herein described may be implemented in an integrated circuit for incorporation into one or more of the communication units.

Furthermore, it is intended that boundaries between logic blocks are merely illustrative and that alternative embodiments may merge logic blocks or circuit elements or impose an alternate composition of functionality upon various logic blocks or circuit elements. It is further intended that the small wireless mesh networks depicted herein are merely exemplary, and that in fact many other small wireless mesh network or architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

We claim:

1. A network entity provisioned to support cloud services for a mesh network that includes at least one edge node configured to: manage the mesh network, communicate with end nodes or mesh routers, and provide routing into an internet protocol network, wherein the network entity comprises:
   a processor, operably coupled to a content store; and
   a content agent registry coupled to the processor and configured to:
      arrange content contained in the content store on a per attribute basis, wherein at least one attribute of the per attribute basis is associated with a characteristic of the content, identify the arranged content to be delivered to the at least one edge node based on the at least one attribute,
      record the at least one attribute to determine the arranged content to be delivered to the at least one edge node based on the characteristic of the content,
      specify an application that is required to make use of the delivered content and run on the at least one edge node for the content to be delivered, and
      deliver the specified application with the content to the at least one edge node based on the at least one attribute, wherein the content agent registry is further configured to:
      send an indication to the at least one edge node that new content has arrived at the content store that contains an attribute that matches the at least one attribute recorded in the content agent registry for the at least one edge node to decide whether or not to download the new content in response to the indication wherein the content agent registry comprises a register of the meta-data associated with the content, but where the meta-data is also used to organize the arranged content on a per attribute basis.

2. The network entity of claim 1 wherein the characteristic is associated with the arranged content that is to be delivered according to at least one of the following:
   content that is scheduled;
   content that is made available for a limited period of time;

content that is made available for a particular geographic location.

3. The network entity of claim 2, wherein the processor is configured to identify whether the arranged content being delivered to the at least one edge node is associated with content that has a limited period of time, and, upon identifying that the arranged content being delivered to the at least one edge node is associated with content that has a limited period of time, the processor is configured to autonomously download new content associated with the content of the at least one attribute to the at least one edge node at a given rate.

4. The network entity of claim 2, wherein the processor is coupled to a content scheduler and configured to identify whether the arranged content to be delivered is scheduled, and, upon identifying that the arranged content being delivered to the at least one edge node is scheduled, the content scheduler is configured to autonomously download new content associated with the content of the at least one attribute to the at least one edge node at a scheduled time.

5. The network entity of claim 2, wherein the processor is configured to identify whether new content arrived in the content store relates to a geographical attribute stored in the content registry, and, upon identifying that the new content relates to a geographical attribute stored in the content registry of an edge node, the processor is configured to autonomously download the new content associated with the arranged content of the at least one attribute to the at least one edge node.

6. The network entity of claim 1, wherein the content agent registry is configured to perform at least one of the following:
use the at least one attribute(s) to determine whether the content store contains any arranged content matching the at least one attribute(s) and, if said matched arranged content is identified, to deliver said matched arranged content to the at least one edge node;
determine whether other arranged content with the identified at least one attribute is stored in the content store, and, if other arranged content with the identified at least one attribute exists, to download the other arranged content to the edge node;
organise multiple attributes associated with the various arranged content in a hierarchical form, including high order attributes that encompass more content or low level attributes that encompass specific content.

7. The network entity of claim 6, wherein the processor is configured to perform at least one of the following:
deliver said matched arranged content to the at least one edge node by pushing the arranged content from the content store to the at least one edge node in response to the at least one attribute contained in the content agent registry;
receive a query for the content from the at least one edge node, send a response to the query and facilitate said matched arranged content being pulled by the at least one edge node from the content store in response to the at least one attribute contained in the content agent registry.

8. A method for provision of content from a cloud service to at least one edge node in a mesh network operably coupled to a content store, wherein the at least one edge node is configured to: manage the mesh network, communicate with end nodes or mesh routers, and provide routing into an internet protocol network, method comprises, at a network entity:

arranging content contained in the content store on a per attribute basis, wherein at least one attribute of the per attribute basis is associated with a characteristic of the content;
identifying at least one attribute associated with the arranged content to be delivered to the at least one edge node based on the at least one attribute; recording the at least one attribute as being associated with the content in a content agent registry to be delivered based on the characteristic of the content;
specifying an application that is required to make use of the delivered content and run on the at least one edge node for the content to be delivered;
delivering the specified application with the content based on the at least one attribute to the at least one edge node; and
sending an indication to the at least one edge node that new content has arrived at the content store that contains an attribute that matches the at least one attribute recorded in the content agent registry for the at least one edge node to decide whether or not to download the new content in response to the indication wherein the content agent registry comprises a register of the meta-data associated with the content, but where the meta-data is also used to organize the arranged content on a per attribute basis.

9. The method of claim 8 further comprising supporting the content being pulled by the at least one edge node in response to a match.

10. An edge node for a mesh network that is configured to support cloud services and manage the mesh network, communicate with end nodes or mesh routers, and provide routing into an internet protocol network, wherein the edge node comprises:
a processor, operably coupled to a content store; and
a user input coupled to the processor and configured to enable a user of the edge node or a user of a device coupled to the edge node to provision at least one attribute that identifies what future content the user desires or needs, wherein the at least one attribute is based on a characteristic of the content; and
a transmitter coupled to the processor and configured to send the at least one attribute to a network entity that comprises a content agent registry to record and identify content to be delivered to the edge node based on the at least one attribute;
a receiver coupled to the processor and configured to:
receive a specified application required to make use of the delivered content and run on the edge node with identified content from the content agent registry based on the at least one attribute; and
receive an indication that new content has arrived that contains an attribute that matches the at least one attribute recorded in the content agent registry for the edge node to decide whether or not to download the new content in response to the indication wherein the content agent registry comprises a register of the meta-data associated with the content, but where the meta-data is also used to organize the arranged content on a per attribute basis.

11. The edge node of claim 10 wherein the characteristic is associated with content that is to be delivered according to at least one of the following:
content that is scheduled;
content that is made available for a limited period of time;
content that is made available for a particular geographic location.

12. The edge node of claim 10 wherein the processor and transmitter are configured to perform at least one of the following:
- send a query to the network entity's content agent register for content to be downloaded;
- pull the content from the network entity based on a response to the query received from the network entity;
- pull a mobile application in addition to the content from the network entity to enable a subscriber device to run the downloaded content.

* * * * *